(12) United States Patent
Körner et al.

(10) Patent No.: US 7,210,375 B2
(45) Date of Patent: *May 1, 2007

(54) UNITARY CASE FOR AN ANGULAR DRIVE

(75) Inventors: Tillmann Körner, Zang (DE); Achim Paul Schieder, Krummennaab (DE); Peter Walter, Durbach (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/938,188

(22) Filed: Sep. 10, 2004

(65) Prior Publication Data

US 2005/0160875 A1    Jul. 28, 2005

Related U.S. Application Data

(63) Continuation of application No. 10/070,872, filed on Jun. 4, 2002, now Pat. No. 6,810,770.

(51) Int. Cl.
*F16H 1/14* (2006.01)
*F16H 1/20* (2006.01)
*F16H 57/02* (2006.01)
*F16H 61/00* (2006.01)

(52) U.S. Cl. .................. 74/606 R; 74/417; 74/400; 475/230

(58) Field of Classification Search .............. 74/606 R, 74/417, 400; 475/230, 83, 231, 82, 246, 475/220

See application file for complete search history.

(56) References Cited

U.S. PATENT DOCUMENTS

| | | | |
|---|---|---|---|
| 2,910,882 A | 11/1959 | Wellauer | 74/412 |
| 3,350,958 A | 11/1967 | Casale | 74/417 |
| 4,282,765 A | 8/1981 | Ashauer et al. | 74/417 |
| 4,339,965 A | 7/1982 | Hauser et al. | 74/607 |
| 4,463,823 A | 8/1984 | Tsuboi | 180/226 |
| 4,527,443 A | 7/1985 | Ohoka | 74/417 |
| 4,553,624 A | 11/1985 | Yoshii | 180/255 |
| 4,742,725 A * | 5/1988 | Nagai | 74/409 |
| 5,363,723 A | 11/1994 | Hoffman | 74/606 R |
| 5,480,360 A | 1/1996 | Patzer et al. | 475/230 |
| 5,807,200 A | 9/1998 | Hauser | 475/83 |

(Continued)

FOREIGN PATENT DOCUMENTS

DE    837 629    4/1952

(Continued)

OTHER PUBLICATIONS

Office Action dated Nov. 19, 2001, in DE 100 42 472.4.

*Primary Examiner*—Vinh T. Luong
(74) *Attorney, Agent, or Firm*—Baker & Daniels LLP

(57) ABSTRACT

The application relates to a unitary case for a plurality of angular drives which comprises at least one bevel gear step with a first bevel gear and a second bevel gear, and which is provided for achieving various angles between a transmission input shaft and a transmission output shaft. The second bevel gear is coupled to the transmission output shaft in an indirect rotationally fixed manner. The unitary case is designed for a plurality of possible angular outputs wherein multiplication is substantially constant and the outer diameters of the individual bevel gears are substantially identical.

15 Claims, 6 Drawing Sheets

U.S. PATENT DOCUMENTS

| | | |
|---|---|---|
| 6,524,208 B1 | 2/2003 | Hollermann et al. .......... 475/91 |
| 6,969,336 B1 * | 11/2005 | Korner et al. .............. 475/343 |

FOREIGN PATENT DOCUMENTS

| | | |
|---|---|---|
| DE | 902 699 | 1/1954 |
| DE | 1 284 804 | 12/1968 |
| DE | 91 02 998.8 | 8/1991 |
| DE | 197 27 153 | 5/1999 |
| DE | 197 27 153 C2 | 5/1999 |
| FR | 2 610 057 | 7/1988 |
| GB | 2 000 734 A | 1/1979 |
| GB | 2 223 068 A | 6/1988 |
| JP | 02-017244 | 1/1990 |
| JP | 3-51567 | 3/1991 |
| JP | 3-117761 | 5/1991 |
| JP | 5-270288 | 10/1993 |
| JP | 09-210144 | 8/1997 |
| WO | WO 99/45295 | 9/1999 |

* cited by examiner

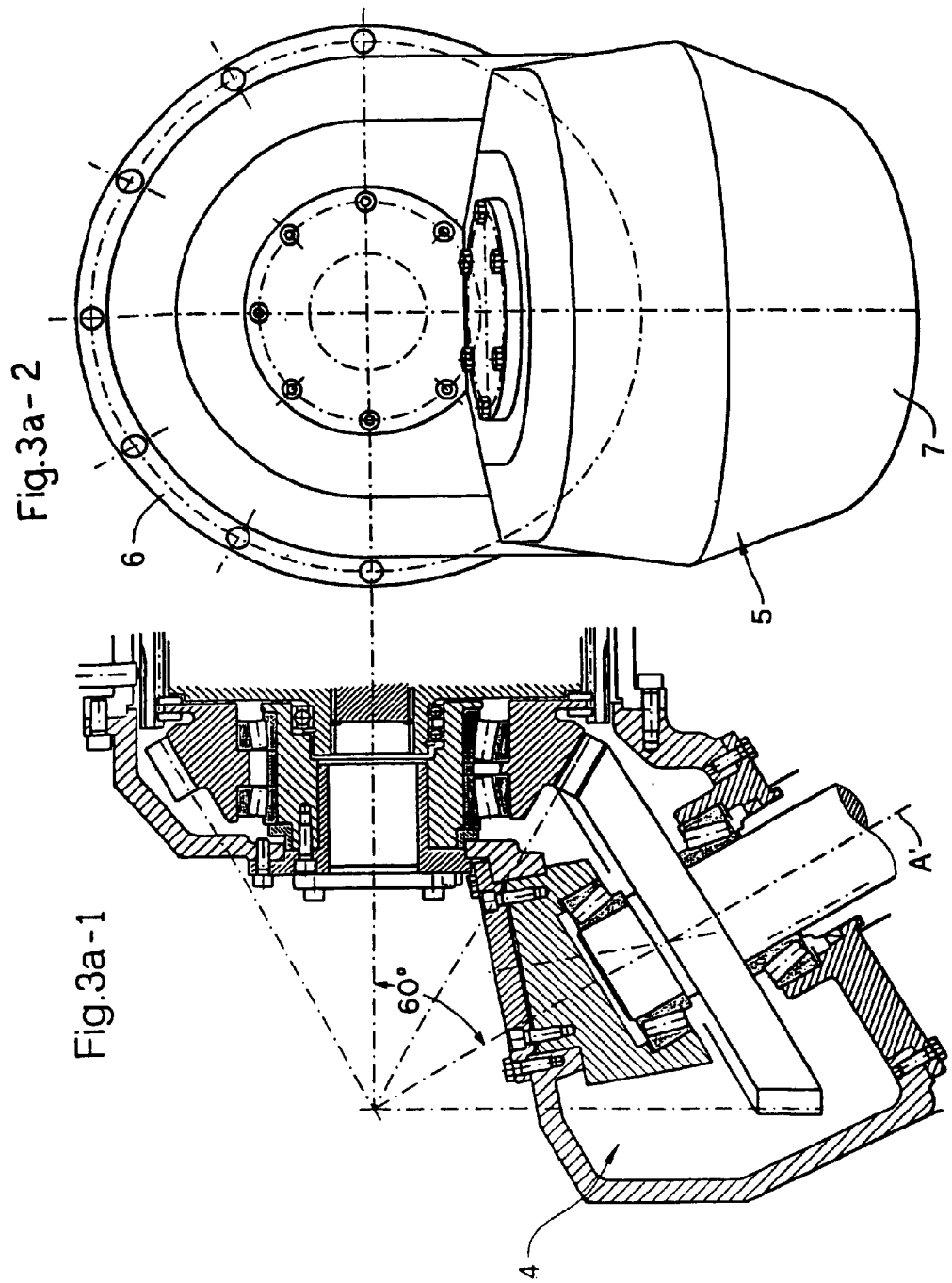

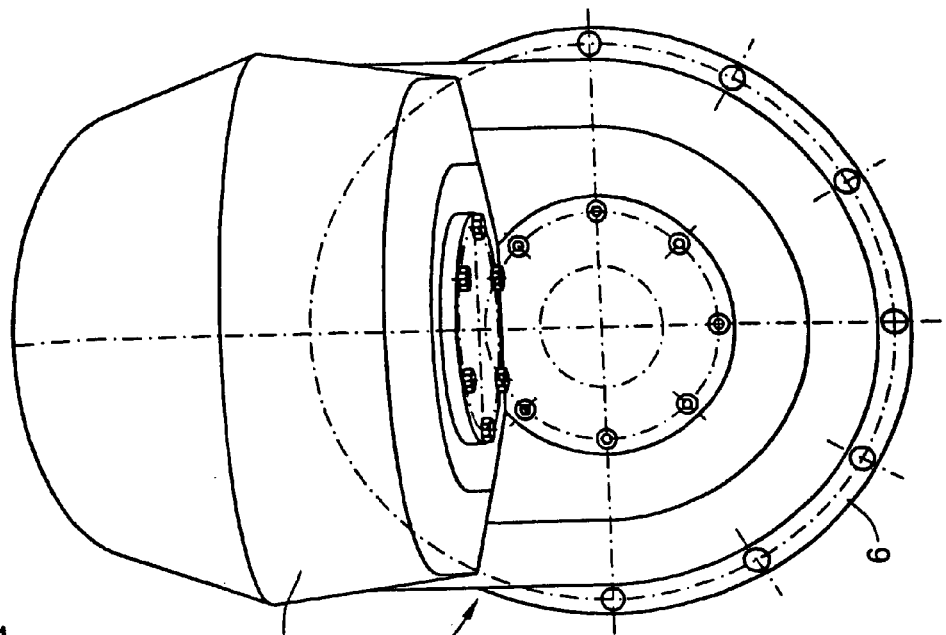
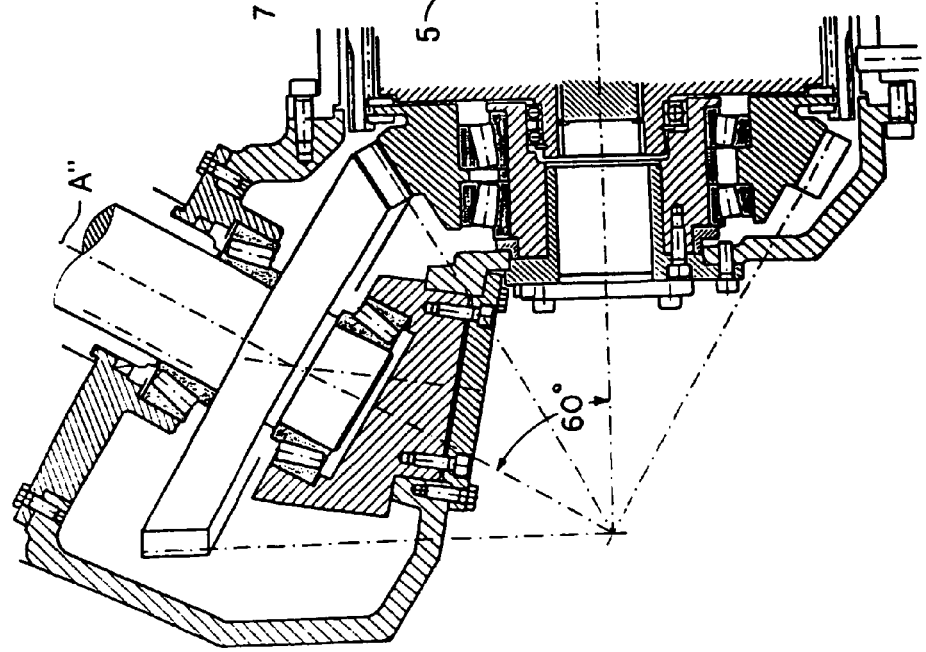

Fig.4.1
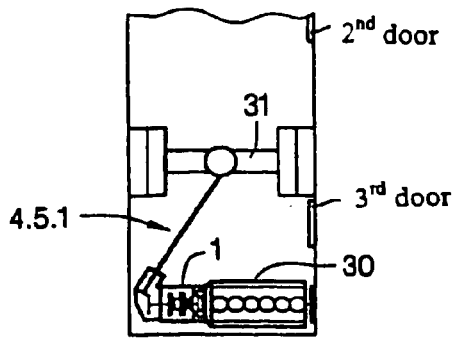
Bus drive, transverse axle, centric, angular drive 60°, 65°, right-hand traffic
Fig.4.2
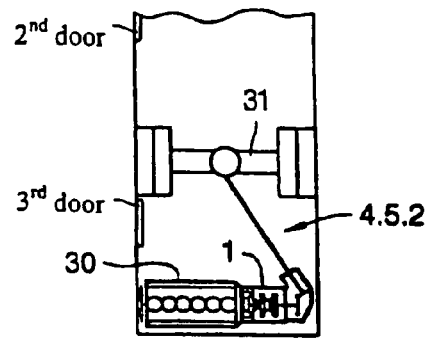
Bus drive, transverse axle, centric, angular drive 60°, 65°, left-hand traffic
Fig.4.3
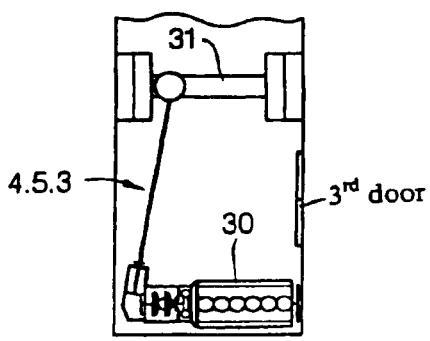
Low-platform bus drive, transverse portal axle, offset, angular drive 80°, right-hand traffic
Fig.4.4
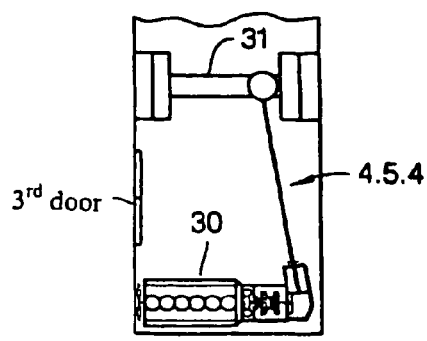
Low-platform bus drive, transverse portal axle, offset, angular drive 80°, left-hand traffic

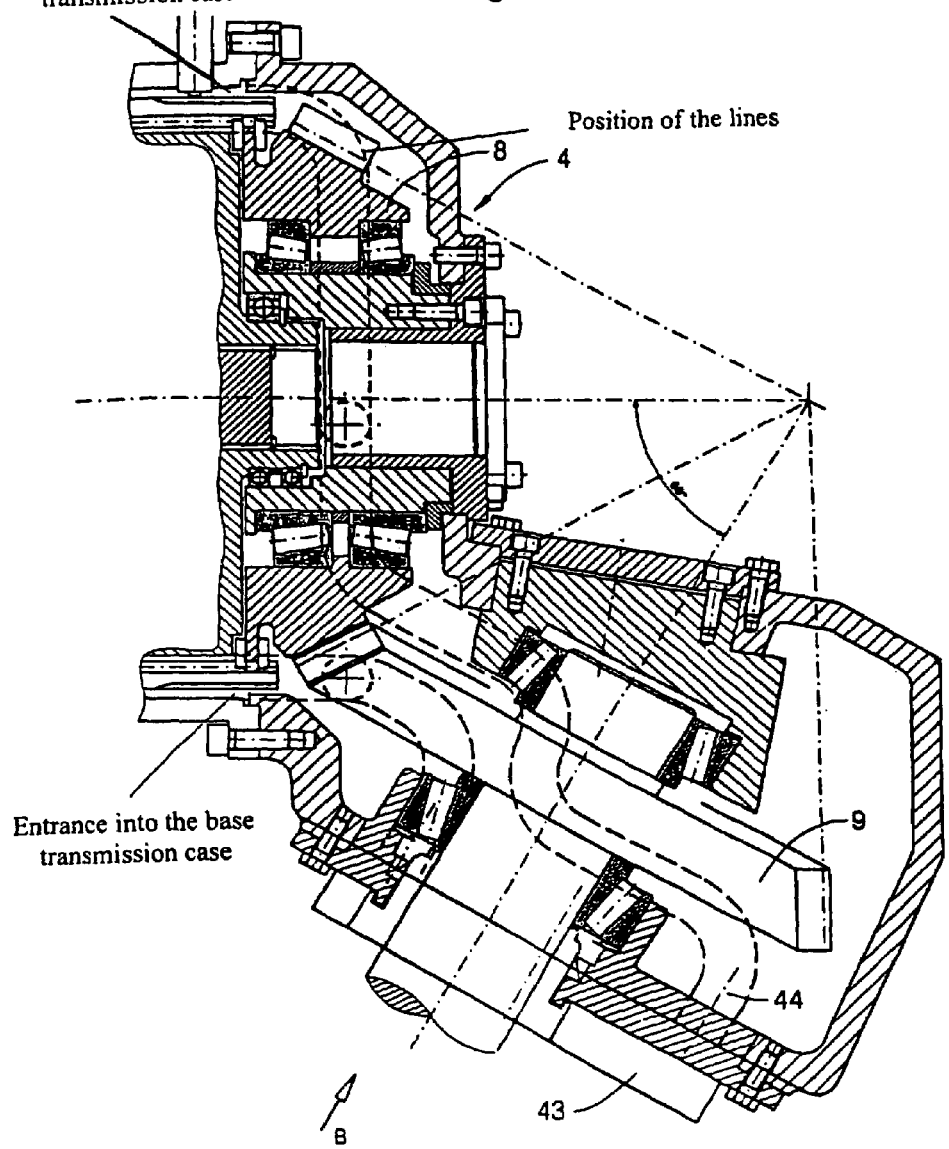

UNITARY CASE FOR AN ANGULAR DRIVE

CROSS-REFERENCE TO RELATED APPLICATION

This is a continuation of application Ser. No. 10/070,872, filed Jun. 4, 2002, now U.S. Pat. No. 6,810,770.

BACKGROUND OF THE INVENTION

The invention relates to a unitary case for an angular drive of a transmission unit.

Transmission units are available in many different configurations. They differ, for example, with regard to how the speed/torque conversion is realized, which can be purely mechanical or combined with other converting options, for example. Especially for the transmission units with purely mechanical power transmission or with a mechanical combined with another power transmission the requirement for a universally applicable transmission unit is increasing. In order to realize the output drive at a certain angle relative to the transmission input shaft, angular drives are used for such transmission units which are combined with a base transmission unit. With these, a certain angle can be realized between the transmission input shaft and the transmission output shaft. For varying requirements, i.e. varying output angles, varying drive torque transmission and tilting angles relative to the road, a separate, specially configured transmission case or a certain unitary case has to be provided which encompasses the angular drive accordingly. Due to the many different case variants that are possible and the low degree of standardization production is more complex and costs are high.

SUMMARY OF THE INVENTION

Therefore, the aim of the invention is to further develop a case for a plurality of angular drives for use in transmission units with mechanical or combined power transmission such that the overall transmission unit can be equipped with a standardized case for varying output drive variants and that the overall transmission unit will have a minimal overall length.

It should also be possible to develop the overall transmission unit for various application requirements by means of an easy modification of a base transmission unit. In particular, the possibility of creating a unitary case for realizing the most varied angular drives should be provided. The solution of the invention should also be characterized by minor constructive efforts.

In accordance with the invention, a unitary case for a plurality of angular drives comprising at least one bevel gear step with a first bevel gear and a second bevel gear for realizing various angles between a transmission input shaft and a transmission output shaft, where the second bevel gear can be coupled to the transmission output shaft in an at least indirect rotation-proof manner, for a plurality of the theoretically possible angular outputs has a virtually constant multiplication i and a constant outside diameter of the individual bevel gears with identical outside dimensions. In the unitary case, bearing receiving devices are assigned to the transmission output shaft and/or the second bevel gear. Said devices are formed by the inside contour of the unitary case and/or by replaceable bearing support elements that are dimensioned for receiving the bearings of the transmission output shaft.

Most of the theoretically possible angular drives that can be placed in the unitary case can be defined by two limit positions of the intersecting points of the flank lines of the bevel gears. A first limit position for the angular drive with the largest theoretically possible or desired angle between the transmission input shaft and the transmission output shaft is characterized by the intersection located closest to the case and a second limit position for the angular drive with the smallest theoretically possible angle between the transmission input shaft and the transmission output shaft is characterized by the intersection of the flank lines located furthest away from the case. The limit positions preferably define a range between 90 and <180° for the angular drive.

Therefore, the individual angular drives differ merely with regard to the angle between the transmission input shaft and the transmission output shaft in installed condition, which also corresponds to the angle between the bisecting lines of the individual bevel gears and thus the entrance and exit of the angular drive. The solution of the invention allows that various angular outputs are encompassed by one single case. The output angle is determined only by the production method, especially by how the inside contour is formed by means of milling, cutting or the like, and by the configuration of the bearing receiving devices. Therefore, with regard to the dimensions of the transmission unit the customer does not depend on various angular outputs. Instead, a unitary case can be offered for a transmission unit consisting of a base transmission unit with various angular outputs.

The inside contour for any theoretically possible angle between the transmission input shaft and the transmission output shaft can be provided by means of metal cutting the inside wall of the case accordingly. When a corresponding bearing receiving device is used, it preferably has two bearing support elements that are assigned to the transmission output shaft, each for receiving at least one bearing, a first bearing support element and a second bearing support element.

The bearing support elements each form a running surface for the individual bearings. The first bearing support element serves to support the end area of the transmission output shaft in the case, while the second bearing support element serves to support the transmission output shaft in the area of the exit of the case.

According to an especially advantageous embodiment with a minimum number of components, at least one of the bearing support elements, the first and/or second bearing support element, forms a part of the outside wall of the case. Preferably, both bearing support elements are components of the case.

According to a further development, the second bearing support element is already provided with connections and/or lead-throughs for fuel lines and/or ducts for electric lines so that these can be additionally modified for a certain angular drive separate from the rest of the case.

Further standardization is achieved by disposing a second heat exchanger on the second support element.

The bearing support elements can be mounted on the inside wall of the case in various different ways, for example by means of mounting elements. The bearing support elements preferably have uniform outside dimensions, especially in the surface areas contacting the inside wall of the case or interacting with indentations or projections on the inside wall of the case. This offers the advantage that the unitary case without the bearing support elements is also configured uniformly for all theoretically possible angular drives, and only the actual support surfaces for the bearings on the bearing support elements will vary.

The case for a transmission unit comprising a base transmission unit and an angular drive with a base transmission case that is assigned to the base transmission unit is equipped with a unitary case that is assigned to the angular drive.

If, according to a special embodiment of the base transmission unit, a plurality of channels for supplying fuel and/or lubricant and/or coolant is disposed in the base transmission case, respective complementary connecting channels in the unitary case are assigned to the channels for supplying fuel and/or lubricant and/or coolant forming channels that extend through the transmission unit for supplying fuel and/or lubricant and/or coolant when the base transmission case and the unitary case are joined.

The transmission unit can be a mechanical transmission unit, which means that the speed/torque conversion is achieved solely by means of mechanical transmission elements. It is conceivable, however, that the transmission unit has a combined power transmission. The following embodiments are conceivable, for example:
  a) mechanical-hydrodynamic combination transmission
  b) mechanical-hydrostatic combination transmission
  c) mechanical-electric combination transmission comprising a base transmission disposed between the transmission input shaft and the transmission output shaft and an angular drive that is connected with the output drive of the base transmission in an at least indirect rotation-proof manner.

The angular drive comprises at least one bevel gear step with a first bevel gear and a second bevel gear, where the second bevel gear can be coupled with the transmission output shaft in an at least indirect rotation-proof manner.

The first bevel gear can be connected with the mechanical transmission part in various ways. The following are conceivable methods:
  a) coupling with an output drive shaft of the mechanical transmission part
  b) coupling with a transmission element of the mechanical transmission part.

The rotation-proof connection can be non-positive and/or positive locking. An embodiment is preferably used where the mechanical transmission part comprises a planetary gear step and where the rotation-proof connection of the first bevel gear is realized with the internal gear acting as a transmission element. Again, the connection can be non-positive and/or positive and/or material-locking. Preferably, however, the first bevel gear and the transmission element of the planetary gear step are configured as an integral unit.

The first bevel gear of the angular drive and a transmission element of the base transmission unit forming the output drive of the base transmission unit are preferably connected in a direct rotation-proof manner and disposed spatially close together.

If the base transmission unit comprises at least one planetary gear set with at least one internal gear, a sun wheel, planetary wheels and a bridge or a spur gear set the output drive of the base transmission unit is formed by an element of the planetary gear set or the spur gear set. According to an especially preferred embodiment, the first bevel gear of the bevel gear step can be coupled with the internal gear of the planetary gear step so as to be rotation-proof.

If the first bevel gear is coupled with an internal gear of the mechanical transmission part in a rotation-proof manner, and if the case has the above described form the first bevel gear can have an especially large diameter, which results in an especially short and compact overall size. The second bevel gear coupled with the output drive shaft is preferably installed and removed via the flanging of the overall angular drive. The angular drive elements are positioned separately from the standardized positioning of the output drive, i.e. the transmission output shaft, which is why the bearings do not have to be readjusted when the angular drive is flange-mounted. The cooling devices that are otherwise flange-mounted to the cover of a base transmission with no angular drive can be mounted in the end area of the angular drive. The necessary connecting lines will then not have to be produced with flexible hoses. They can enter the case in the form of channels.

The individual elements of the bevel gear step can be configured with a straight tooth system or a helical tooth system. Preferably, tooth systems are used where the individual tooth element has a constant tooth height. For the configuration with a helical tooth system an involute tooth system is preferably used. The helical tooth system allows an especially quiet operation.

The solution of the invention allows that all angles and output drive torques are covered by one single angular drive case. Due to the diameter-emphasized construction the angular drive is highly compact and short. Maintenance and the assembly and disassembly of the bearing wheels and gears are very easy.

BRIEF DESCRIPTION OF THE DRAWINGS

The solution of the invention will be explained below by means of the figures, showing the following:

FIG. 3 is a simplified illustration according to a view A of FIGS. 1 and 2 showing the possibility of mounting the angular drive;

FIGS. 4.1 to 4.4 illustrate the possibilities of using the transmission unit of the invention for the drive mechanism of a bus with varying requirements;

FIG. 5 illustrates a further development of the unitary case.

DETAILED DESCRIPTION

Figure 1:
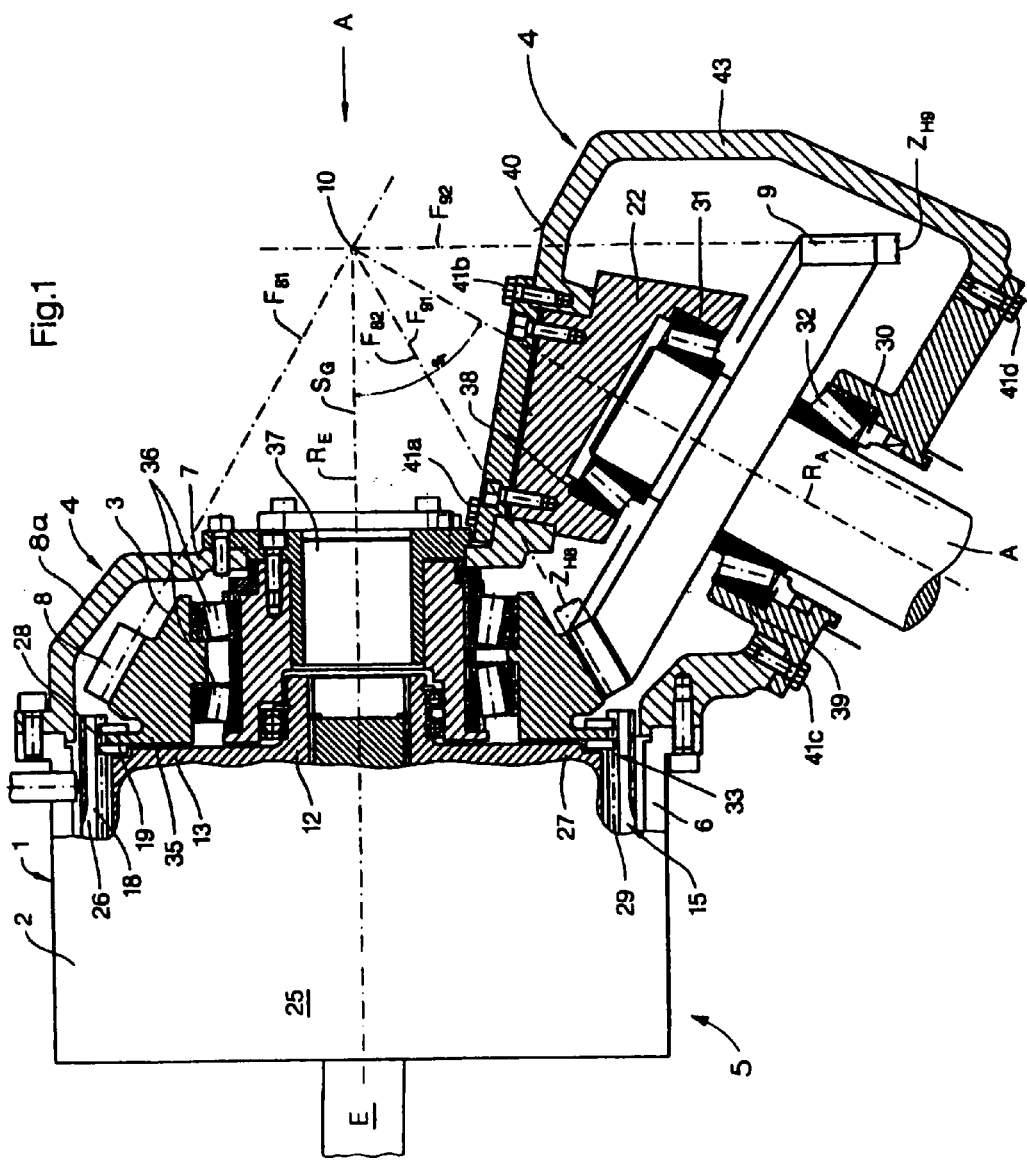
FIG. 1 is a schematically simplified illustration of a view in axial direction of a transmission unit configured in accordance with the invention.

FIG. 1 is a schematically simplified illustration of a section of an axial profile of a transmission unit 1 showing the installation in accordance with the invention of an angular drive 4 in the base transmission 25. The transmission unit has a transmission input shaft E and at least one transmission output shaft A acting as output drive. The transmission input shaft E and the transmission output shaft A are disposed such that their theoretical axes of rotation $R_E$ and $R_A$ are at an angle relative to each other. The transmission unit 1 comprises at least one base transmission 25 disposed between the transmission input shaft E and the transmission output shaft A. The base transmission unit 25 comprises a mechanical transmission part 2, an output drive 15 and a bevel gear step 3 configured as an angular drive 4, which is coupled to the transmission output shaft A.

The transmission unit 1 also has a transmission case 5, which consists of at least two parts. In this case, it comprises at least a base transmission case 6 and a unitary case 7 which at least partially encompasses the angular drive 4 and which can be connected with the transmission case 6. However, the unitary case 7 can also consist of multiple parts.

The angular drive 4, which is formed by a bevel gear step 3, has at least two bevel gears working together, a first bevel gear 8 having teeth 8a and a second bevel gear 9 having teeth 9a. The first bevel gear 8 is disposed coaxially relative to the transmission input shaft E. The second bevel gear 9, which can be coupled to the transmission output shaft A so as to be rotation-proof, is disposed at a certain angle relative to the first bevel gear 8.

The theoretical axes of rotation of the individual bevel gears or their axes of symmetry that correspond to the theoretical axes of rotation of the transmission input shaft and the transmission output shaft $R_E$ and $R_A$, intersect at a point 10 on the axis of symmetry of the transmission unit 1. At said point, the flank lines F of the tooth system of the individual bevel gears also intersect when projected on a common level E with the axis of symmetry of the transmission $S_G$. The flank lines are referenced $F_{81}$, $F_{82}$ and $F_{91}$, $F_{92}$. The tooth systems of the individual bevel gears are preferably configured as a straight tooth system, but a configuration as a helical tooth system or a curved tooth system with curving flank lines is also conceivable. In bevel gears with curved flank lines, these can be configured as circular arcs, involutes or epicycloids. In the illustrated case, the bevel gears 8 and 9 have a constant tooth height $Z_{H8}$ and $Z_{H9}$. The following explanations relate to the straight tooth system specified in FIG. 1.

These explanations can be applied analogous to other tooth systems.

For a certain base transmission unit 25 angular drives 4 are provided for realizing various angles between the transmission input shaft E and the transmission output shaft A. Said angular drives 4 are configured such that the individual flank lines of a straight tooth system or the flank lines projected on a level with the gear axis $S_G$ can form various angles with the gear axis $S_G$. The individual angular drives 4 that are theoretically suitable for a unitary case 7 for realizing various angles between the transmission input shaft E and the transmission output shaft A, which are characterized by a substantially constant multiplication between the individual bevel gears 8 and 9 and by substantially constant outside diameters of the individual bevel gears 8 and 9, cover a certain area in axial direction of the gear axis $S_G$ with regard to the intersecting points of their flank lines $F_{81}$, $F_{82}$, $F_{91}$, $F_{92}$ with the gear axis $S_g$. The configuration of the transmission case 5 and the unitary case 7 encompassing the angular drive is based on said area. In order to preferably realize a standard case 5, including the unitary case 7, for a base transmission unit 1 under various output drive conditions, i.e. varying angles of the transmission output shaft A relative to the transmission input shaft E, the second unitary case 7 is standardized in such a way that it is suitable for receiving all theoretically possible or desired angular drives 4, where the only differentiating criterion is the angle between the transmission input shaft E and the transmission output shaft A, while the multiplication ratio and the outside diameter of the bevel gears remain constant for the individual theoretically possible angles. Therefore, the base transmission case of the unitary case 7 is configured for the two theoretical limit cases so that the intersecting point 10 of the flank lines of the bevel gears 8 and 9 of the bevel gear step 3 is closest to and furthest away from the transmission case 5 or the unitary case 7 in axial direction.

The first limit case can correspond to the situation of an angular drive 4 of 90°, for example, or even a higher than 90° angle. It does not have to be determined precisely, but it should be within the theoretically possible range, and the structural feasibility should also be taken into consideration.

However, an angular drive with an angle in the range between 90° and <180° between the transmission input shaft E and the transmission output shaft A is preferable. An angle of <180° represents the second limit case. As mentioned above, the outside contour for various angular drives 4 with substantially identical multiplication i and an identical outside diameter $d_A$ of the individual bevel gears 8 and 9 remains constant, while the adaptation to various angular drives, especially the arrangement of the bearings is achieved by means of configuring or cutting the inside contour of the case, especially the unitary case 7.

The embodiment of the unitary case according to the invention for a plurality of the theoretically possible angular output drives with virtually constant multiplication i and identical outside diameter of the individual bevel gears 8 and 9 for various angular drives with identical outside dimensions comprises bearing receiving devices 20 that are assigned to the transmission output shaft A and/or to the second bevel gear 9 in the unitary case 7. The bearing receiving devices 20 are formed by the inside contour 21 of the unitary case and/or by replaceable bearing support elements that are dimensioned for receiving the bearings of the transmission output shaft. The illustrated case corresponds to the second alternative where the bearing support elements 22 and 30 are assigned to the transmission output shaft. They are used for receiving at least one bearing 31 and 32 each. The bearing support elements 22 and 30 each form a running surface 38 and 39 for the individual bearings 31 and 32. The first bearing support element 22 is used for supporting the end area of the transmission output shaft A in the case 7.

The second bearing support element 30 is used for supporting the transmission output shaft A in the area of the exit from the case 7. Both bearing support elements 22, 30, the first and/or second bearing support element, form a part of the outside wall 40 of the case 7. The support elements 22 and 30 can be mounted on the outside wall 43 of the case by means of mounting elements 41a, 41b, 42a, 42b.

The tight coupling between the first bevel gear 8 and the elements of the mechanical transmission part 2 can be achieved by various different methods. In the illustrated preferred embodiment a mounting method was selected, which is characterized by an especially compact size for the overall transmission unit 1, because the first bevel gear 8 can be configured with a very large bevel gear diameter. In this case, it is mounted to a transmission element of a planetary gear set 27 of the base transmission unit 25, which at the same time forms the output drive 15 for the base transmission unit 25, and thus the entrance for the angular drive 4. The planetary gear set comprises a sun wheel 12, an internal gear 26, planetary wheels 13 and a bridge 14. The transmission element forming the output drive 15 is formed by the internal gear 26 of the planetary gear set 27. The coupling is achieved by a rotation-proof connection by means of positive and non-positive locking. The rotation-proof connection is referenced 33. It is realized by the engagement of complementary driver elements 18 and 19 on the internal gear 26 and the first bevel gear 8. The bevel gear 8 is configured with a respective outside tooth system 28 which can engage in a complementary inside tooth system 29 on the internal gear 26. The inside tooth system 29, which is provided on the internal gear 26 in any case, is preferably used for this. To this aim, the internal gear is lengthened only in axial direction as seen in installed position in the transmission unit 1, so that in addition to the planetary wheels 34 of the planetary gear set 27 the internal gear interacts with the outside tooth system 28 of the bevel gear 8.

To this aim, the bevel gear 8 has a respectively configured outside tooth system 28 in a second partial section 35 which is free of the bevel tooth system.

Furthermore, the case 7 encompassing the angular drive 4 and which in installed position forms a modular unit in combination with the base case 6, is assigned to the angular drive 4. In order to realize a unit which can be preassembled the angular drive 4 is provided with respective bearing devices 36 and an axle 37 for supporting, which is disposed stationary in the case 7. The case 7 can consist of one part, but it can also consist of multiple parts, as shown in FIG. 1. The multiple part configuration is preferred so as to facilitate the assembly.

The advantage of the angular drive 4 embodiment as a modular unit is that it can be integrated easily as one unit into the overall transmission unit 1. This is accomplished by pushing together, and thus engaging the outside tooth system 28 and the inside tooth system 29 of the internal gear. It is secured against shifting in axial direction by connecting the first bevel gear 8 with the case 7 and by connecting the case 7 and the base transmission case 6 of the base transmission unit 25, which is required for realizing the overall transmission unit 1. Additional securing elements are not required.

Figure 2:
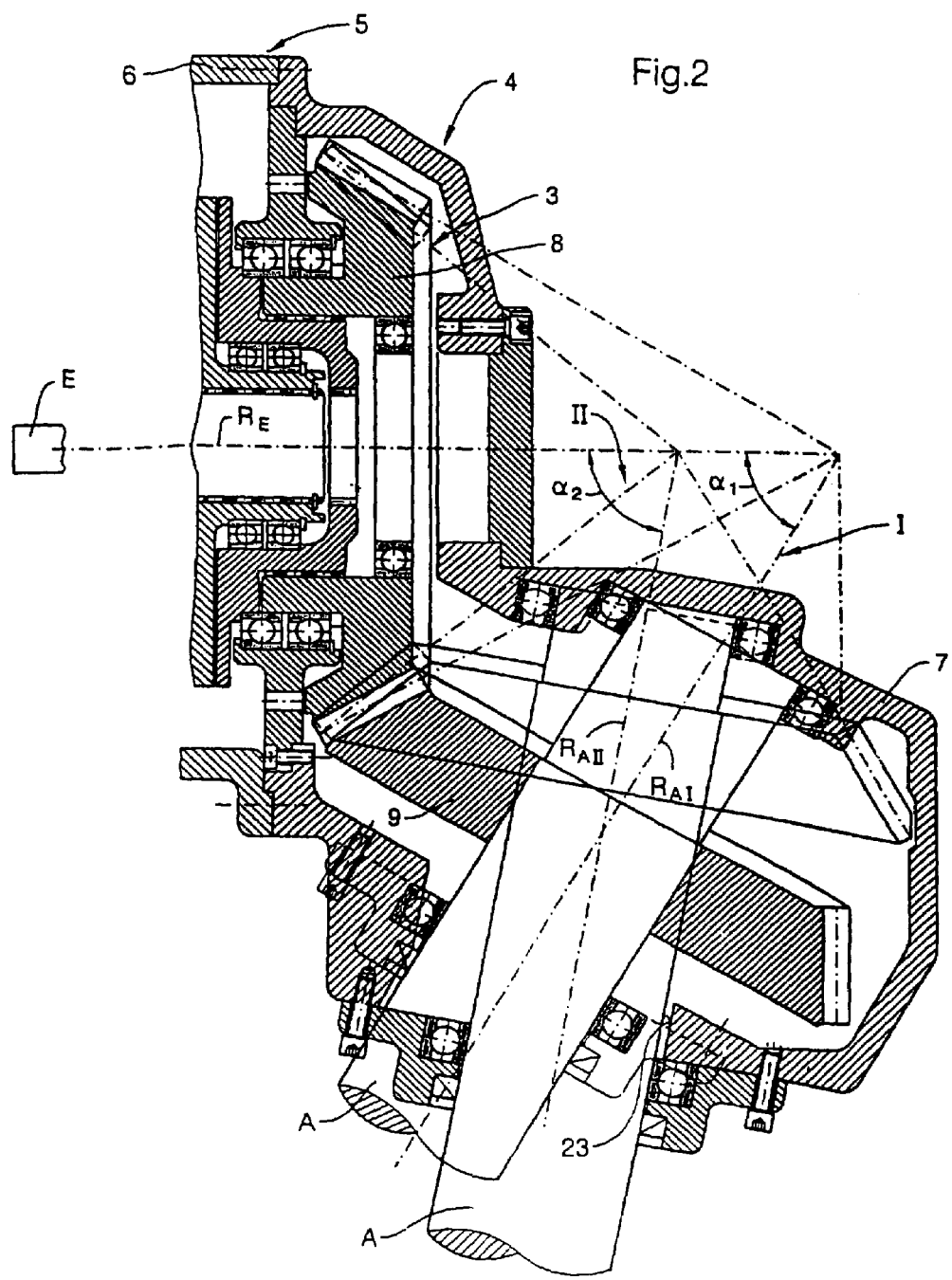
FIG. 2 is a schematically simplified illustration of the positioning of the transmission output shaft A at two different angles between the transmission input shaft and the transmission output shaft.

FIG. 2 is a schematically simplified representation of the positioning of the transmission output shaft A at two different angles (limit positions I and II) between the transmission input shaft E and the transmission output shaft A in a selected installed position of the transmission unit. Variant I corresponds to an angle $\alpha_1$ of 60° between the transmission input shaft E and the transmission output shaft A, while Variant II refers to the positioning with an arrangement of the transmission output shaft A relative to the transmission input shaft E at an angle $\alpha_2$ of 80°.

The unitary case 7 also has a through-opening 23 for the exit of the transmission output shaft A. Preferably, a constant theoretical opening range 23 is provided for all unitary cases 7. The max. size corresponds to the angular range a which can theoretically be covered by the transmission output shaft A.

The unitary case 7 can be connected non-positive and/or positive locking with the transmission case 6. They are preferably coupled via fastners such a screw and/or plug-in connections. The indentations and through-openings on the base transmission case 6 and on the unitary case 7 required for realizing the connection are preferably configured such that they can be turned in circumferential direction of the transmission unit 1 so as to realize various arrangements for the bevel gear step 3, especially the second bevel gear 9 and thus the angular drive 4 relative to the installed position of the transmission unit, and thus of the transmission case 5 relative to the latter. Possible exemplary positions are shown in FIGS. 3a and 3b for a view referenced A according to FIG. 1 or 2. This possibility is of enormous importance, especially when the transmission case 5 has a certain design that is tied to a certain installation position. This is always the case when grooves or channels are provided, for example, for lubricants or the like. The possible installation positions for output drives shown in FIG. 3 are designated with A' and A", where A' represents an embodiment suitable for left-hand traffic and A" in FIG. 3b represents an embodiment for right-hand traffic.

The embodiment of the unitary case 7 described in FIGS. 1 and 2 also allows a method of disassembling the second bevel gear 9 which departs from the conventional method.

While the second bevel gear 9 in the conventional designs was removed in the direction of the axis of symmetry of the transmission output shaft A the embodiment of the unitary case 7 of the invention allows that the unitary case 7 is first released from the rest of the transmission case 5 and when the transmission output shaft A has been released from the bevel gear 9, the latter is laterally rolled out of the interior space 11 formed by the unitary case 7. This makes it possible to shift the entire bevel gear step 3 further into the interior of the transmission case 5 in axial direction, because the unitary case 7 no longer depends on the area of the through-opening 23 in the transmission output shaft A having a size that allows the second bevel gear 9 to be removed in the same direction.

Other possibilities for realizing the removal of the second bevel gear 9 require a respective configuration of the opening 23. According to an alternative embodiment, which is not shown, the through-opening of the transmission output shaft A can be elliptic. In this case, the max. dimension corresponds to the outside diameter $d_A$ of the second bevel gear 9. For removal, the connection between the transmission output shaft A and the second bevel gear 9 is likewise released first and the second bevel gear 9 is moved to the elliptic opening by means of tilting.

The configuration of the transmission case 5 according to FIGS. 1 to 3, especially the unitary case 7, allows that a unitary case is created by means of which various angular drives 4 can be covered. The output drive angle is defined only by the configuration or production and shaping of the inside contour in the area of the second bevel gear, which is coupled to the transmission output shaft A. By separating the case into a base transmission case 6 and a so-called unitary case 7 the angular drive 4 can be shifted further in the direction of the transmission input shaft in axial direction compared to conventional configurations.

Therefore, the very short overall size is achieved via the flange-mounting of the overall angular drive. The above described preferred disassembly method allows a free configuration of the output drive side and results in a very short size, which also saves material. The base transmission unit can be tested without an angular drive 4.

FIG. 4 shows examples of possible applications of a transmission unit 1 of the invention with a unitary case comprising the base transmission case 6 and the unitary case 7. The term unitary case 7 should not be understood to mean that it allows a complete closure. It can also be provided with openings, which can be covered by lid-shaped elements.

FIG. 4.1 illustrates the transmission unit 1 of the invention used in a bus drive system with a transversely installed drive mechanism 30 for driving an axle 31 disposed between the second and third door of a bus. The drive mechanism 30 is coupled to the transmission unit 1 for torque/speed conversion. The output drive shaft 32 of the mechanical transmission part runs coaxial relative to the transmission input shaft E. The axle drive is achieved via the angular drive 4.51 centrically on the axle 31. The angular drive 4.51 has a 60 or 65° angle. This embodiment is suitable especially for right-hand traffic.

FIG. 4.2 illustrates an embodiment according to FIG. 4.1 by means of a schematically simplified view of a bus drive system. Again, the drive mechanism 30 is installed transversely, again with a centric axle drive. The embodiment differs from the one described in FIG. 4.1 by a change in the direction of the power flow between the drive mechanism 30 and the transmission unit 1. This embodiment is especially suitable for left-hand traffic.

FIGS. 4.3 and 4.4 illustrate exemplary applications in so-called low platform busses where the drive mechanism 30 again is disposed transversely to the driving direction and the portal axis 31 is driven off-center, i.e. offset, via an angular drive 4.53 or 4.54. The embodiment in FIG. 5.3 is suitable for right-hand traffic, and the embodiment in FIG. 5.4 is suitable for left-hand traffic. The angular drive, i.e. the angle between the transmission input shaft E and the transmission output shaft A is 80° in this case.

FIG. 5 illustrates a preferred further development of the unitary case as per FIGS. 1 to 4 where the heat exchanger 43 is flange-mounted directly to the transmission case in the area of the transmission output shaft A. The oil tubes used in conventional designs should be eliminated, which is achieved by respectively configuring the unitary case 7 with respectively integrated cooling channels 44, preferably provided directly in the housing wall.

The invention claimed is:

1. A transmission unit, comprising:
   a transmission input shaft and a transmission output shaft;
   a base transmission disposed between the transmission unit input shaft and the transmission unit output shaft;
   an angular drive which is connected with an output drive of the base transmission in at least indirectly rotation-proof manner;
   the angular drive comprising at least one bevel gear step including a first bevel gear and a second bevel gear, where the second bevel gear is coupled to the transmission output shaft in an at least indirectly rotation-proof manner;
   a transmission case for the base transmission and the angular drive including a base transmission case assigned to the base transmission and a unitary case assigned to the angular drive;
   the second bevel gear supported in the unitary case;
   the unitary case being connected locked with the transmission case whereby fasteners and through openings on the base transmission case and on the unitary case for connecting the base transmission and unitary cases are configured such that the base transmission and unitary cases are selectively rotatable relative to each other in the circumferential direction of the transmission unit when unlocked so as to realize various arrangements for the second bevel gear and thus the angular drive relative to a selected installed position of the transmission unit and thus of the base transmission case relative to the installed position of the transmission unit.

2. The transmission unit as defined in claim 1, wherein the unitary case is configured for a plurality of the theoretically possible angular drives with the following features:
   multiplication of rotary motion i is substantially constant and
   the outside diameters of the individual bevel gears are substantially identical with substantially identical outside dimensions;
   in the unitary case, bearing receiving devices are assigned to at least one of the transmission output shaft and the second bevel gear;
   the bearing receiving devices are formed by at least one of an inside contour of the unitary case and bearing support elements that are dimensioned for receiving bearings of the transmission output shaft,
   the theoretically possible angular drives for the unitary case are defined by two limit positions of the intersecting points of the flank lines of the bevel gears, wherein:
   a first limit position for the angular drive with the largest theoretically possible angle between the transmission input shaft and the transmission output shaft is characterized by the intersection located closest to the unitary case and a second limit position for the angular drive with the smallest theoretically possible angle between the transmission input shaft and the transmission output shaft is characterized by the intersection of the flank lines located furthest away from the unitary case.

3. The transmission unit as defined in claim 2, wherein the inside contour is generated for any theoretically possible angle between the transmission input shaft and the transmission output shaft by respectively metal cutting of the inside wall of the case.

4. The transmission unit as defined in claim 3, characterized by the following features:
   a first bearing support element serves to support an end area of the transmission output shaft in the unitary case;
   a second bearing support element that serves to support the transmission output shaft in the area of the output shaft's exit from the case.

5. The transmission unit as defined in claim 1, wherein the limit positions define a range of the angular drive between 90° and <180°.

6. The transmission unit as defined in claim 1, including:
   a bearing receiving device of the transmission output shaft having two bearing support elements assigned to the transmission output shaft for receiving at least one bearing,
   the bearing support elements each form a running surface for the respective individual bearings.

7. The transmission unit as defined in claim 6, wherein at least one of the bearing support elements forms a part of the outside wall of the unitary case.

8. The transmission unit as defined in claim 6 and including a heat exchanger disposed on one of the second support elements.

9. The transmission unit as defined in claim 6, wherein the support elements are mounted on the inside wall of the unitary case by means of mounting elements.

10. The transmission unit as defined in claim 1, wherein the first bevel gear of the angular drive and a transmission element of the base transmission unit forming the output drive of the base transmission unit are connected so as to be directly rotation-proof and are disposed spatially close to each other.

11. The transmission unit as defined in claim 10, wherein the bevel gears have a tooth system that is configured as a straight tooth system.

12. The transmission unit as defined in claim 1, wherein:
    the base transmission unit comprises at least one planetary gear set with at least one internal gear, a sun wheel and planetary wheels;
    the output drive of the base transmission unit is formed by an element of the planetary gear set.

13. The transmission unit as defined in claim 12, wherein the first bevel gear of the bevel gear step is coupled to the internal gear of the planetary gear set in a rotation-proof coupling relative thereto.

14. The transmission unit as defined in claim 13, wherein the coupling of the first bevel gear and internal gear is one of non-positive and positive locking.

15. The transmission unit as defined in claim 14, wherein the rotation-proof coupling is realized by means of an integral construction of the first bevel gear and the output drive shaft of the base transmission or the first bevel gear and the transmission element of the base transmission.

* * * * *

UNITED STATES PATENT AND TRADEMARK OFFICE
CERTIFICATE OF CORRECTION

| | |
|---|---|
| PATENT NO. | : 7,210,375 B2 |
| APPLICATION NO. | : 10/938188 |
| DATED | : May 1, 2007 |
| INVENTOR(S) | : Tillmann Korner et al. |

It is certified that error appears in the above-identified patent and that said Letters Patent is hereby corrected as shown below:

Title Page
Insert the following:

30 Foreign Application Priority Data

Sep. 14, 1999    (DE)............................299 17 006

Signed and Sealed this

Tenth Day of July, 2007

JON W. DUDAS
*Director of the United States Patent and Trademark Office*